UNITED STATES PATENT OFFICE.

RAYMOND WELCH TUNNELL, OF PHILADELPHIA, PENNSYLVANIA.

VEGETABLE GLUE OR ADHESIVE.

1,275,799.  Specification of Letters Patent.  Patented Aug. 13, 1918.

No Drawing.  Application filed December 22, 1917.  Serial No. 208,463.

*To all whom it may concern:*

Be it known that I, RAYMOND W. TUNNELL, a citizen of the United States, and a resident of Philadelphia, in the county of Philadelphia and State of Pennsylvania, have invented a new and Improved Vegetable Glue or Adhesive, of which the following is a full, clear, and exact description.

My composition belongs to that large class of adhesives of vegetable origin produced from starch, and is characterized by the production of an improved adhesive from unhydrolyzed starch.

An object of the invention is to provide an adhesive which is suitable for all classes of work to which vegetable adhesives are applied.

Another object of the invention is to devise a method of obtaining the product which is inexpensive, as it eliminates the machinery necessary for hydrolyzing the starch, in addition to the labor connected therewith.

A further object of the invention is to provide a mixture mechanically prepared which, when treated with water, will produce a paste similar to, and acting substantially as, adhesives, prepared from hydrolyzed starch-containing compounds.

I have discovered that if starches of different grades are mixed in certain proportions and thereto hydroxid is added, which hydroxid is adapted to form an insoluble compound in the body of the starch after the same is treated with water, the resulting paste is in every respect and in action similar to hydrolyzed starches, particularly when certain quantities of cassava are blended in certain proportions.

The hydroxids I prefer to use are those giving white, insoluble precipitates, so that the appearance of the paste is enhanced and the resulting precipitates are slimy or gelatinous and, therefore, tend to increase the adhesiveness and body of the paste, in addition increasing the waterproof qualities of the same, due to the fact that they form precipitates in the water added to form the paste from the dry mixture.

If tapioca of low grade is mixed with tapioca of high grade and thereto an hydroxid of the alkaline earth metals is added in proportions of one-tenth to one-quarter of one per cent., a mixture will be formed which, when treated with water, produces an adhesive the quality of which is considerably enhanced, particularly its consistency, in addition to the adhesiveness. In place of adding the hydroxid in dry form, a solution of same may be prepared in the water and the mixture of starch treated with that solution. The results are identical.

If eighty per cent. of a low grade tapioca is mixed with twenty per cent. of a high grade tapioca and a barium hydroxid, in dry form, and water added thereto, the barium hydroxid will go into solution. A reaction will take place between the barium hydroxid and the starch with the result that a barium salt of the lactate or similar organic acid is formed, which is insoluble and which will be distributed through the gelatinous body of the starch. The resulting compound will be of high consistency and adhesiveness. In place of barium, strontium or calcium hydroxids may be used. It is self-evident that if the hydroxids are dissolved previously in water the resulting compound will be identical to the result obtained when the starch, with the dry hydroxids, is treated with water.

I claim:

1. The process of making adhesive from starch compounds which consists in mixing starch with barium hydroxid.

2. The process of making adhesive from starch compounds which consists in mixing starch of high and low grade of the same origin and adding thereto an hydroxid of the alkaline earth metals.

3. The process of making adhesive from starch compounds which consists in mixing starch of high and low grades of the same origin and adding thereto barium hydroxid.

4. The process of making adhesive from starch compounds which consists in blending tapioca of high and low grade, the quantity of the low grade exceeding the quantity of the high grade, and adding thereto barium hydroxid.

5. The process of making adhesive from starch compounds which consists in blending eighty per cent. of low grade tapicoa with twenty per cent. of high grade tapioca, and adding an alkaline earth hydroxid thereto so that the proportions of the hydroxid by weight is from one-tenth to one-quarter of one per cent. of the amount of the starch used.

6. An adhesive formed by a mixture of low and high grade tapicoa and a barium hydroxid.

7. An adhesive formed by eighty per cent. of low grade tapioca, twenty per cent. of high grade tapioca, and one-tenth to one-quarter of one per cent. by weight of barium hydroxid.

RAYMOND WELCH TUNNELL.